United States Patent Office 3,249,576
Patented May 3, 1966

3,249,576
ELASTOMERIC POLYURETHANES DERIVED FROM POLYETHERS OR POLYESTERS, DIISOCYANATES AND BIS-(AMINOOXY) ALKANES
Jean Auguste Phelisse, Max Gruffaz, and Bernard Rollet, Lyon, France, assignors to Rhone-Poulenc S.A., Paris, France, a French body corporate
No Drawing. Filed July 1, 1963, Ser. No. 292,146
Claims priority, application France, July 10, 1962, 903,537
11 Claims. (Cl. 260—32.6)

This invention relates to elastomeric polymers derived from linear polyethers or polyesters of low molecular weight.

The elastomeric polyurethanes of the invention consist substantially completely of units of the formula:

—CO—NH—T—NH—CO—O—Z—O—CO—NH
—T—NH—CO—NH—O—R—O—NH    I where T is a divalent aliphatic, cycloaliphatic or aromatic radical, R is an alkylene radical and Z is a polyester or polyether residue such that the compound HO—Z—OH is a linear, hydroxy-terminated polyester or polyether of molecular weight 500 to 2500.

The new polyurethanes are produced by a process which comprises first reacting a polyester or polyether formula HO—Z—OH with at least 2 molecular proportions of a diisocyanate of formula: OCN—T—NCO, and then reacting the isocyanate-terminated polymer thus obtained with one molecular proportion of a bis(aminooxy)alkane of formula: H$_2$N.O—R—O.NH$_2$, Z, T, and R being as above defined.

The polymers of the invention form long linear chains bridged at a few points by groups resulting from the action of diisocyanates on certain of the —NH— groups in the linear chains. The proportion of these bridges increases as the excess of diisocyanate of formula

OCN—T—NCO used in the first reaction is greater.

The polyurethanes of the invention can be used for the manufacture of elastic films, fibres and filaments, and because of their solubility in solvents generally employed in spinning (for example, dimethylsulphoxide and dimethylformamide), it is possible, by carrying out the process, or only the second stage thereof, in such a solvent, to obtain directly a spinnable solution.

The linear polyethers or polyesters used as starting materials have a molecular weight of 500 to 2500, preferably 1200 to 2000, and have two terminal hydroxyl groups. Polyesters should moreover have a practically zero acid index in order to avoid any secondary reactions of the free acid functions with the diisocyanate used in the process. The polyesters can be made, for example, by condensing together an aliphatic dicarboxylic acid of formula HOOC(CH$_2$)$_n$COOH, where $n$ is 2 to 8, such as adipic acid and an alkylene glycol of 2 to 4 carbon atoms, such as ethylene glycol, propylene glycol or a mixture thereof. Polyethers can be of the polyethyleneoxide or polytetrahydrofuran types.

The organic diisocyanates used for the invention are aliphatic, cycloaliphatic or aromatic diisocyanates; they may also be formed by aromatic rings interconnected by aliphatic groups, heteroatoms or various functional groups. Preferred diisocyanates are those in which T is phenylene, tolylene, alkylene of 2 to 10 carbon atoms, or

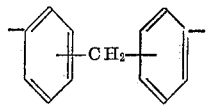

and especially diisocyanato-4,4' diphenylmethane and hexamethylene diisocyanate.

The bis-(aminooxy)alkanes have the formula

H$_2$NO—R—ONH$_2$ in which R is an alkylene radical —(CH$_2$)$_n$—, in which $n$ is preferably 2 to 6. They are the di-O-ethers of hydroxylamine and α,ω-diols. They can be prepared, for example, by the action of potassium hydroxylamine disulphonate on dibromoalkanes [Traube, Chem. Ber. 53, 1477 (1920); Palazzo, Gazz. Chim. Ital. 84, 915 (1954)].

The first reaction in the process of the invention is conveniently carried out by causing the polyester or polyether to react with the diisocyanate in an anhydrous organic solvent medium comprising no grouping which is reactive with isocyanates, for example, in benzene, cyclohexane or dichloromethane. There is preferably used for this reaction, in order to obtain elastic polymers with good mechanical properties, 2.2 to 2.8 mols of diisocyanate per mol of polyester. The reaction is carried out by very gradual heating of the reagents; when the boiling temperature of the mixture is reached, the heating is continued under reflux for about 1 hour. Once the reaction has ended, the solvent is removed by evaporation or other known means, the reaction mass is again heated for one hour to 70–75° C. and then allowed to cool to ambient temperature. It is then taken up in a solvent for the prepolymer to be produced, such as dimethylformamide, with vigorous stirring until a homogeneous solution is obtained, and this solution is cooled to about 0° C. before the diaminooxyalkane is introduced in a quantity substantially equimolecular with that of the initial polyester.

The diaminooxyalkane may optionally be used in the form of one of its mineral salts, from which it is produced by adding an organic base to the isocyanate-terminated prepolymer solution to be treated.

For the second reaction, of the prepolymer with the diaminooxyalkane, it is preferable for the diaminooxyalkane to be in solution in a solvent, preferably the same solvent as that in which the prepolymer is already in solution, and to effect the addition with brisk stirring. While it is possible to operate in either the cold or hot state, cooling to about 0° C. is, as already stated, preferred.

When all evolution of heat has ceased, which indicates the completion of the reaction, a transparent solution of the polyurethane is obtained, which can be used directly for the manufacture of pliable, elasitic yarns and fibres in accordance with the known dry or wet spinning procedures.

The following examples illustrate the invention and show how it may be put into practice.

EXAMPLE 1

Into a 250-cc. flask equipped with a stirrer and a reflux condenser, there are introduced 8.8 g. of a hydroxyl-terminated mixed polyadipate of ethyleneglycol and propyleneglycol, having a molecular weight of 1760, the said polyadipate having been obtained from starting materials used in the proportions: 1 mol. of adipic acid, 0.72 mol. of ethylene glycol, and 0.48 mol. of propylene-1,2-glycol. 3.25 g. of diisocyanato-4,4'-diphenylmethane (i.e. an excess of 30%, relatively to the theoretical quantity calculated from the hydroxyl group content of the polyester) in solution in 17.5 cc. of anhydrous dichloromethane are added, and the mixture is brought to boiling point and heated under reflux (temperature 45–48° C.) for 2 hours. The solvent is then removed by gradual heating to 70° C., under normal pressure, and the heating of the reaction mixture is then continued at 70–75° C. for 1 hour with stirring. After cooling to about 30° C., 20 cc. of dimethylformamide are introduced into the flask, with vigorous stirring, to obtain a homogeneous solution which is then cooled to −5° C. before a solution of 0.46 g. of 1,2-diaminooxyethane in 10 cc. of dimethylformamide is added thereto over about 5 minutes with brisk stirring. The reaction is then allowed to continue, with strong cooling to keep the temperature at 0° C., and the reaction is ended when the liberation of heat ceases. There is thus obtained a light yellow solution from which it is possible to produce elastic films and fibres. Elastic films prepared with this solution, from which all trace of solvent has been removed by heating to 120° C. for 2 hours have a breaking resistance of 403 kg./cm.$^2$ and an elongation at break of 905% (traction test according to French standard T 46,002).

EXAMPLE 2

The process is carried out as in Example 1, but with a smaller excess of diisocyanato-4,4′-diphenylmethane (3 g. instead of 3.25 g., or an excess of only 20%).

The films prepared with the solution obtained under these conditions are dried for 2 hours at 120° C. have a breaking resistance of 316 kg./cm.$^2$ and an elongation at break of 822%.

EXAMPLE 3

2.2 g. of disocyanato-1,6-hexane (an excess of 30%) is caused to react with 8.8 g. of the polyester used in Example 1, operating under the same conditions as in Example 1. The prepolymer obtained is dissolved in 25 cc. of dimethylformamide and then treated with 0.46 g. of 1,2-diaminooxyethane in solution in 10 cc. of the same solvent. There is thus obtained a homogeneous, transparent and colourless solution, from which elastic films are prepared which have an elongation at break of 1050% and a breaking resistance of 250 kg./cm.$^2$.

EXAMPLE 4

Operating as described in Example 1, 7.14 g. of a mixed ethyleneglycol and propyleneglycol adipate polyester, with terminal hydroxyl groups and a molecular weight of 1428, are reacted with 3 g. of diisocyanato-4,4′-diphenylmethane in solution in 17.5 cc. of dichloromethane, the period of heating under reflux being 30 minutes. The product obtained is then treated with 0.46 g. of 1,2-diaminooxyethane as in Example 1. From the solution obtained on completion of the reaction, films are prepared which, after drying for 2 hours at 120° C., have the following properties: breaking resistance=535–544kg./cm.$^2$; elongation at break=780–798%; and resilience, 71.2%.

The polyadipate used as starting material was prepared using the reactants in the proportion of 1 mol. of adipic acid, 0.72 mol. of ethylene glycol and 0.48 mol. of propylene glycol.

EXAMPLE 5

Into a 1-litre flask equipped with a stirrer there are introduced 181.8 g. (0.1 mol) of a mixed ethylene glycol and propylene glycol adipate polyester, having terminal hydroxyl groups and a molecular weight of 1818, and also 33.6 g. of diisocyanato-1,6-hexane (0.2 mol); the mixture is heated to 82° C. for 2 hours. The reaction mixture is then cooled, dissolved in 775 cc. of dimethylformamide and brought to 70° C. There are then added to the flask 168 cc. of a solution of 1,2-diaminooxyethane obtained by dissolving 88 g. of this compound in 1 litre of dimethylformamide. The addition is carried out with vigorous stirring and lasts about 3 minutes. The heating is then stopped and the reaction is allowed to proceed until further evolution of heat ceases. By spinning the solution obtained into water at 80° C., there is obtained a filament which has a breaking resistance of 0.3 g./denier and an elongation at break of 900%.

The polyadipate used as starting material was prepared by using the reactants in the proportion of 1 mol. of adipic acid, 0.72 mol. of ethyleneglycol and 0.48 mol. of propyleneglycol.

We claim:

1. Elastomeric polyurethanes obtained by first reacting (i) a compound of formula HO—Z—OH of molecular weight 500 to 2500 being either (a) a polyester made by condensing an aliphatic carboxylic acid of formula HOOC(CH$_2$)$_n$COOH, where $n$ is 2 to 8, with an alkylene glycol of 2 to 4 carbon atoms, or (b) a polyethylene oxide or polytetrahydrofuran polyether, with (ii) at least 2 molecular proportions of a diisocyanate of formula OCN—T—NCO, where T is phenylene, tolylene, a saturated unsubstituted aliphatic chain of 2 to 10 carbon atoms, or

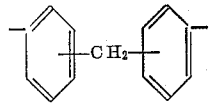

and then reacting the isocyanate-terminated polymer thus obtained with one molecular proportion of a bis(aminooxy)alkane of formula: H$_2$N—O—R—O.NH$_2$, where R is an alkylene radical.

2. Elastomeric polyurethanes as claimed in claim 1 in which T is hexamethylene.

3. Elastomeric polyurethanes as claimed in claim 1 where T is hexamethylene and the compound

HO—Z—OH is a hydroxy-terminated polyester of molecular weight 1200 to 2000 formed by condensing adipic acid with a glycol selected from ethylene and propylene glycols.

4. Elastomeric polyurethanes as claimed in claim 1 in which T is

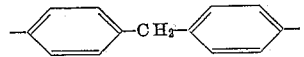

5. Elastomeric polyurethanes as claimed in claim 1 where T is

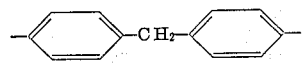

and the compound HO—Z—OH is a hydroxy-terminated polyester of molecular weight 1200 to 2000 formed by condensing adipic acid with a glycol selected from ethylene and propylene glycols.

6. Spinnable solutions of an elastomeric polyurethane obtained by first reacting (i) a compound of formula HO—Z—OH of molecular weight 500 to 2500 being either (a) a polyester made by condensing an aliphatic carboxylic acid of formula HOOC(CH$_2$)$_n$COOH, where $n$ is 2 to 8, with an alkylene glycol of 2 to 4 carbon atoms, or (b), a polyethylene oxide or polytetrahydrofuran polyether, with (ii) at least 2 molecular proportions of a diisocyanate of formula OCN—T—NCO, where T is phenylene, tolylene, a saturated unsubstituted aliphatic chain of 2 to 10 carbon atoms, or

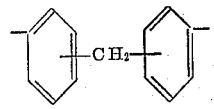

and then reacting the isocyanate-terminated polymer thus obtained with one molecular proportion of a bis(aminooxy)alkane of formula: H$_2$N—O—R—O.NH$_2$, where R is an alkylene radical.

7. Spinnable solutions in dimethylformamide of an elastomeric polyurethane obtained by first reacting (i) a compound of formula HO—Z—OH of molecular weight 500 to 2500 being either (a) a polyester made by condensing an aliphatic carboxylic acid of formula HOOC(CH$_2$)$_n$COOH where $n$ is 2 to 8, with an alkylene glycol of 2 to 4 carbon atoms, or (b), a polyethylene oxide or polytetrahydrofuran polyether, with (ii) at least 2 molecular proportions of a diisocyanate of formula OCN—T—NCO, where T is phenylene, tolylene, a saturated unsubstituted aliphatic chain of 2 to 10 carbon atoms, or

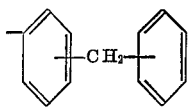

and then reacting the isocyanate-terminated polymer thus obtained with one molecular proportion of a bis(aminooxy)alkane of formula: $H_2N$—O—R—O.$NH_2$, where R is an alkylene radical.

8. Spinnable solutions as claimed in claim 6 where T is hexamethylene and the compound HO—Z—OH is a hydroxy-terminated polyester of molecular weight 1200 to 2000 formed by condensing adipic acid with a glycol selected from ethylene and propylene glycols.

9. Spinnable solutions as claimed in claim 6 where T is

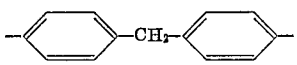

and the compound HO—Z—OH is a hydroxy-terminated polyester of molecular weight 1200 to 2000 formed by condensing adipic acid with a glycol selected from ethylene and propylene glycols.

10. Spinnable solutions in dimethylformamide as claimed in claim 6 where T is hexamethylene and the compound HO—Z—OH is a hydroxy-terminated polyester of molecular weight 1200 to 2000 formed by condensing adipic acid with a glycol selected from ethylene and propylene glycols.

11. Spinnable solutions in dimethylformamide as claimed in claim 6 where T is

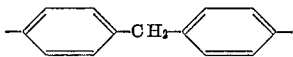

and the compound HO—Z—OH is a hydroxy-terminated polyester of molecular weight 1200 to 2000 formed by condensing adipic acid with a glycol selected from ethylene and propylene glycols.

References Cited by the Examiner

UNITED STATES PATENTS

| | | | |
|---|---|---|---|
| 2,983,702 | 5/1961 | Little et al. | 260—77.5 |
| 3,043,807 | 7/1962 | Snyder et al. | 260—75 |
| 3,087,912 | 4/1963 | Wagner et al. | 260—77.5 |
| 3,105,062 | 9/1963 | Graham et al. | 260—75 |
| 3,114,734 | 12/1963 | Gorbran et al. | 260—75 |

MORRIS LIEBMAN, *Primary Examiner.*